US009603053B2

(12) United States Patent
Edge et al.

(10) Patent No.: US 9,603,053 B2
(45) Date of Patent: *Mar. 21, 2017

(54) SEGMENTED DATA TRANSFER WITH RESUME CAPABILITY

(71) Applicant: QUALCOMM Incorporated, San Diego, CA (US)

(72) Inventors: Stephen William Edge, Escondido, CA (US); Sven Fischer, Nuremberg (DE); Andreas Klaus Wachter, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/604,219

(22) Filed: Jan. 23, 2015

(65) Prior Publication Data
US 2015/0139152 A1 May 21, 2015

Related U.S. Application Data

(62) Division of application No. 13/235,250, filed on Sep. 16, 2011, now Pat. No. 8,942,102.
(Continued)

(51) Int. Cl.
H04W 72/04 (2009.01)
H04L 29/08 (2006.01)
(Continued)

(52) U.S. Cl.
CPC ......... *H04W 28/065* (2013.01); *H04L 1/1657* (2013.01); *H04L 47/14* (2013.01);
(Continued)

(58) Field of Classification Search
CPC ....... H04L 47/14; H04L 47/26; H04L 47/323; H04L 47/365; H04L 67/18; H04L 67/145;
(Continued)

(56) References Cited

U.S. PATENT DOCUMENTS 6,697,331 B1 2/2004 Riihinen et al.
7,480,908 B1 1/2009 Tene et al.
(Continued)

FOREIGN PATENT DOCUMENTS

JP H08340308 A 12/1996
JP 2003274445 A 9/2003
(Continued)

OTHER PUBLICATIONS

3GPP TS 44.031 V9.2.0 Mar. 2010; 3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP), (Release 9), Mar. 2010, pp. 1-144.
(Continued)

Primary Examiner — Brian D Nguyen
(74) Attorney, Agent, or Firm — Silicon Valley Patent Group LLP

(57) ABSTRACT

A large volume of location related information, e.g., assistance data or location information, is transferred in separate messages between a server and a target by segmenting the location related information into a plurality of messages. If the connection between the server and target is released prior to completion of the transfer of the location related information, the transfer is resumed by sending the remaining messages after connection is reestablished. Each message is sent after receiving an acknowledgement of receipt. Thus, both the server and target can control the flow of the transfer by delaying the sending of one or more messages or delaying the sending of the acknowledgements of receipt.

16 Claims, 7 Drawing Sheets

Related U.S. Application Data

(60) Provisional application No. 61/454,931, filed on Mar. 21, 2011, provisional application No. 61/410,681, filed on Nov. 5, 2010.

(51) Int. Cl.

| | | |
|---|---|---|
| *H04L 1/16* | (2006.01) | |
| *H04W 76/02* | (2009.01) | |
| *H04W 28/06* | (2009.01) | |
| *H04L 12/801* | (2013.01) | |
| *H04L 12/825* | (2013.01) | |
| *H04L 12/823* | (2013.01) | |
| *H04L 12/805* | (2013.01) | |
| *H04W 4/02* | (2009.01) | |
| *H04W 4/20* | (2009.01) | |
| *H04L 29/14* | (2006.01) | |
| *H04W 76/04* | (2009.01) | |

(52) U.S. Cl.
CPC ............ *H04L 47/26* (2013.01); *H04L 47/323* (2013.01); *H04L 47/365* (2013.01); *H04L 67/145* (2013.01); *H04L 67/18* (2013.01); *H04L 69/324* (2013.01); *H04L 69/40* (2013.01); *H04W 4/02* (2013.01); *H04W 4/021* (2013.01); *H04W 4/20* (2013.01); *H04W 72/0446* (2013.01); *H04W 76/028* (2013.01); *H04W 76/048* (2013.01); *H04L 47/19* (2013.01)

(58) Field of Classification Search
CPC ..... H04L 69/40; H04L 1/1657; H04L 69/324; H04L 47/19; H04W 76/048; H04W 4/02; H04W 4/20; H04W 72/0446; H04W 76/028; H04W 4/021
See application file for complete search history.

(56) References Cited

U.S. PATENT DOCUMENTS

| | | |
|---|---|---|
| 2002/0110149 A1 | 8/2002 | Roberts et al. |
| 2002/0186660 A1 | 12/2002 | Bahadiroglu |
| 2005/0172199 A1 | 8/2005 | Miller et al. |
| 2006/0123079 A1* | 6/2006 | Sturniolo ............ H04W 80/045 709/203 |
| 2006/0140197 A1 | 6/2006 | Robinson et al. |
| 2006/0280174 A1 | 12/2006 | Villefrance |
| 2007/0008990 A1 | 1/2007 | Torsner |
| 2007/0136481 A1 | 6/2007 | Dierks, Jr. et al. |
| 2008/0234980 A1 | 9/2008 | Wirola et al. |
| 2009/0066571 A1 | 3/2009 | Burroughs et al. |
| 2009/0069031 A1 | 3/2009 | Burroughs et al. |
| 2009/0069032 A1 | 3/2009 | Rowland et al. |
| 2009/0097480 A1 | 4/2009 | Curtis et al. |
| 2009/0219206 A1 | 9/2009 | Garin |
| 2009/0253440 A1* | 10/2009 | Edge ..................... G01S 5/0018 455/456.2 |
| 2010/0232362 A1* | 9/2010 | Tenny ................... H04W 48/10 370/328 |
| 2010/0274872 A1 | 10/2010 | Harrang et al. |
| 2010/0311438 A1 | 12/2010 | Edge et al. |
| 2011/0009130 A1* | 1/2011 | Wu ....................... H04W 64/00 455/456.1 |
| 2011/0013589 A1 | 1/2011 | Wu |
| 2011/0039577 A1* | 2/2011 | Stern-Berkowitz ... G01S 5/0205 455/456.1 |
| 2011/0117925 A1* | 5/2011 | Sampath ............... H04W 64/00 455/456.1 |
| 2012/0051445 A1* | 3/2012 | Frank .................... H04L 5/0048 375/259 |
| 2012/0244852 A1 | 9/2012 | Edge et al. |
| 2012/0287806 A1 | 11/2012 | Williams |
| 2013/0315235 A1 | 11/2013 | Foo |
| 2016/0014639 A1 | 1/2016 | Edge et al. |

FOREIGN PATENT DOCUMENTS

| | | |
|---|---|---|
| JP | 2008538466 A | 10/2008 |
| JP | 2008271097 A | 11/2008 |
| WO | 2005011308 | 2/2005 |
| WO | WO-2008032750 A1 | 3/2008 |
| WO | 2009124206 A2 | 10/2009 |

OTHER PUBLICATIONS

Digital cellular telecommunications system (Phase 2+); Location Services (LCS); Mobile Station (MS)—Serving Technical Specification, European Telecommunications Standards Institute (ETSI), 650, Route Des Lucioles; F-06921 Sophia-Antipolis; France, vol. 3GPP GERAN 2, No. V9.2.0, Mar. 1, 2010 (Mar. 1, 2010), XP014046967. Chapters 2 and 3; p. 7-p. 15 Chapters 4.2 to 4.4; p. 16-p. 17 extended reference definition; p. 31 Chapter A.2.2.5; p. 61 Chapters A.3.2.7 and A.3.2.8; p. 75 Chapter A.4.2.4; p. 85-p. 86 Chapters A.5 and A.6; p. 137-p. 138.

Edge S., et al., "LPPe 1.0 TS Assistance Data Segmentation", Qualcomm, Nov. 5, 2010 (Nov. 5, 2010), XP002669605, Retrieved from the Internet: URL:http://member.openmobilealliance.org/ftp/public documents/loc/2010/0MA-LOC-2010-0276-CR_LPPe_1.0_TS_Assistance_Data_Segmentation.zip [retrieved on Feb. 15, 2012] Change 1 of OMA-CR 276; p. 2-p. 5.

International Search Report and Written Opinion—PCT/US2011/052163—ISA/EPO—Mar. 9, 2012.

Lie; Evolved Universal Terrestrial Radio Access (E-UTRA); LTE Positioning Protocol (LPP) (3GPP TS 36.355 version 9.3.0 Release 9) , Technical Specification, European Telecommunications Standards Institute (ETSI), 650, Route Des Lucioles; F-06921 Sophia-Antipolis; France, vol. 3GPP RAN 2. No. V9.3.0., Oct. 1, 2010 (Oct. 1, 2010), XP014061714, Chapters 4 and 5; p. 11-p. 22.

Taiwan Search Report—TW100136117—TIPO—Jun. 18, 2014.

* cited by examiner

SEGMENTED DATA TRANSFER WITH RESUME CAPABILITY

CROSS-REFERENCE TO RELATED APPLICATIONS

This application is a divisional of and claims priority under to U.S. application Ser. No. 13/235,250, filed Sep. 16, 2011, now U.S. Pat. No. 8,942,102, which claims priority under 35 USC 119 to both U.S. Provisional Application No. 61/454,931, filed Mar. 21, 2011, and U.S. Provisional Application No. 61/410,681, filed Nov. 5, 2010, all of which are assigned to the assignee hereof and which are incorporated herein by reference.

BACKGROUND

It is often desirable, and sometimes necessary, to know the location of a terminal, e.g., a cellular phone. The terms "location" and "position" are synonymous and are used interchangeably herein. For example, a location services (LCS) client may desire to know the location of the terminal. The terminal (e.g. a User Equipment (UE), a Mobile Station (MS), a Secure User Plane (SUPL) Enabled Terminal (SET), etc.) may then communicate with a location server to obtain a location estimate for the terminal. The terminal or the location server may then return the location estimate to the LCS client.

A message flow (which may also be referred to as a call flow or a procedure) may be executed to establish a location session whenever the LCS client desires to know the location of the terminal. Various messages may be exchanged between the terminal and the location server via one or more network entities for the message flow. These messages may conform to a positioning protocol such as the Long Term Evolution Positioning Protocol (LPP) defined by the $3^{rd}$ Generation Partnership Project (3GPP) or the LPP Extensions (LPPe) protocol being defined by the Open Mobile Alliance (OMA). The messages may transfer assistance data from the location server to the terminal to assist the terminal to obtain location related measurements (e.g. measurements of signals from GPS satellites) and/or to compute a location estimate from these measurements. The messages may also transfer location information (e.g. measurements or a location estimate) from the terminal to the location server to enable the location server to determine the location of the terminal.

Some positioning protocols such as LPPe may allow large amounts of location assistance data to be transferred from a location server to a terminal. One example would be long term satellite orbital data for multiple Global Navigation Satellite Systems (GNSSs). Another example would be map data for a particular area, region or building structure that could be used by a terminal to help determine its location and/or make use of its location once determined. The size of such assistance data may be significant—e.g. a few hundred kilobytes or even 1 Mbyte or more. Transferring such a large amount of data in a single message or even in a sequence of separate messages could congest the server or terminal and interfere with other activities being performed by the server, terminal and serving access network. In addition, there is a risk that the connection or location session between the server and terminal could fail or be released before all the assistance data has been transferred. In that case, the complete transfer might need to be restarted at a later time.

SUMMARY

A large volume of location related information, e.g., assistance data or location information, is transferred in separate messages between a server and a target (terminal) by segmenting the location related information into a plurality of messages. If the connection between the server and target is released prior to completion of the transfer of the location related information, the transfer is resumed by sending the remaining messages after a connection is reestablished. Each message is sent only after receiving an acknowledgement of receipt for the previous message. Thus, both the server and target can control the flow of the transfer by delaying the sending of one or more messages or delaying the sending of the acknowledgements of receipt.

In one aspect, a method of transferring location related information from a first entity to a second entity includes segmenting the location related information into a plurality of messages by the first entity; sending a first subset of the plurality of messages from the first entity to the second entity, the first subset comprising less than all of the plurality of messages; releasing a connection between the first entity and the second entity after sending the first subset; reestablishing the connection between the first entity and the second entity; and sending a second subset of the plurality of messages from the first entity to the second entity after the connection is reestablished.

In another aspect, an apparatus includes a transceiver to transfer a location related information to a remote entity; and a processor connected to the transceiver, the processor adapted to segment the location related information into a plurality of messages, to sequentially send each message of the plurality of messages to the remote entity with the transceiver, and to resume transfer of the location related information after a connection with the remote entity is released and reestablished prior to completion of the transfer of the location related information by being adapted to send any messages in the plurality of messages that have not been received by the remote entity after the connection with the remote entity is reestablished.

In another aspect, an apparatus for transferring location related information to a remote entity includes means for segmenting the location related information into a plurality of messages; means for sending a first subset of the plurality of messages to the remote entity, the first subset comprising less than all of the plurality of messages; and means for sending a second subset of the plurality of messages to the remote entity after a connection between with the remote entity is released and reestablished.

In another aspect, a non-transitory computer-readable medium including program code stored thereon, includes program code to segment location related information into a plurality of messages; program code to sequentially send each message of the plurality of messages to a remote entity to transfer the location related information, and program code to resume the transfer of the location related information after a connection with the remote entity is released and reestablished prior to completion of the transfer of the location related information including program code to send any messages in the plurality of messages that have not been received by the remote entity after the connection with the remote entity is reestablished.

In another aspect, a method of transferring assistance data from a server to a target, includes segmenting the assistance data into a plurality of LPP ProvideAssistanceData messages by the server; sending a first LPP ProvideAssistanceData message from the server to the target; releasing and reestablishing a connection between the server and the target after sending the first LPP ProvideAssistanceData message;

and sending a second LPP ProvideAssistanceData message from the server to the target after reestablishing the connection.

In another aspect, an apparatus includes a transceiver to transfer assistance data to a target; and a processor connected to the transceiver, the processor adapted to segment the assistance data into a plurality of LPP ProvideAssistanceData messages, to send a first LPP ProvideAssistanceData message to the target with the transceiver, to send a second LPP ProvideAssistanceData message to the target with the transceiver after a connection with the target is released and reestablished.

In another aspect, a method of transferring location information from a target to a server, includes segmenting the location information into a plurality of LPP ProvideLocationInformation messages by the target; sending a first LPP ProvideLocationInformation message from the target to the server; releasing and reestablishing a connection between the target and the server after sending the first LPP ProvideLocationInformation message; and sending a second LPP ProvideLocationInformation message from the target to the server after reestablishing the connection.

In yet another aspect, an apparatus includes a transceiver to transfer location information to a server; and a processor connected to the transceiver, the processor adapted to segment the location information into a plurality of LPP ProvideLocationInformation messages, to send a first LPP ProvideLocationInformation message to the server with the transceiver, and to send a second LPP ProvideLocationInformation message to the server with the transceiver after a connection with the server is released and reestablished.

DETAILED DESCRIPTION

Figure 1:
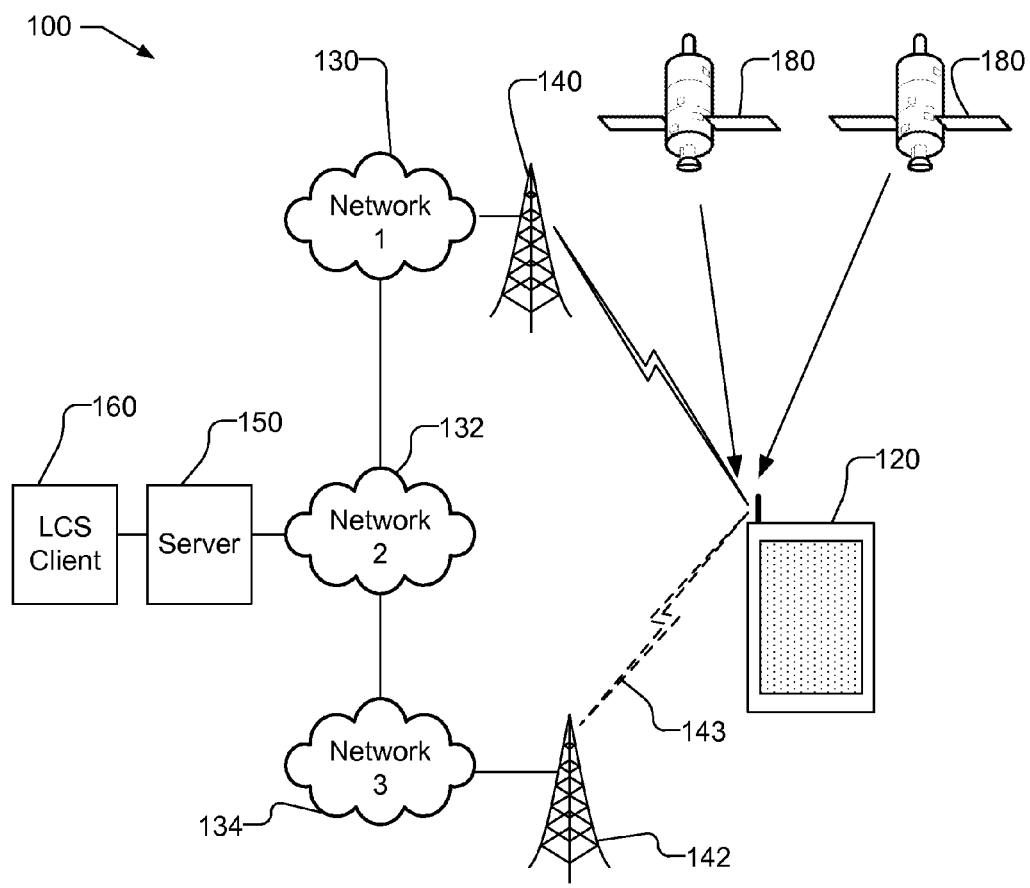
FIG. 1 shows a network architecture capable of transferring a large volume of data, e.g., assistance data or location information, in separate messages.

FIG. 1 shows a network architecture 100 capable of transferring a large volume of data, e.g., assistance data or location information, in separate messages, e.g., LPP/LPPe messages, between a mobile terminal 120 (sometimes referred to as a UE, MS, SET, etc. or generally "target") and a location server 150 (sometimes referred to as a server) at a rate convenient to both the mobile terminal 120 and server 150. The LPP Protocol is described in 3GPP Technical Specification (TS) 36.355 which is publicly available. LPPe is being defined by OMA and would be used in combination with LPP such that each combined LPP/LPPe message would be an LPP message (as defined in 3GPP TS 36.355) containing an embedded LPPe message. While the LPP portion of such a combined message would normally have a restricted size (e.g. a few thousand octets at most typically), the embedded LPPe message could have a size up to and even more than a Megabyte.

A mobile terminal as used herein is a device capable of wirelessly communicating with a server through one or more networks and that supports positioning and location services, which may include but is not limited to the Secure User Plane Location (SUPL) location solution defined by OMA and the Control Plane location solution defined by 3GPP for use with an LTE serving network. The SUPL location solution is defined in documents OMA-TS-ULP-V2_0-20110527-C and OMA-TS-ULP-V3_0-20110819-D from OMA which are publicly available. The control plane location solution for LTE is defined in 3GPP TS 23.271 and 3GPP TS 36.305 which are publicly available. Location services (LCS) may be performed on behalf of an LCS Client 160 that accesses location server 150 and issues a request for the location of mobile terminal 120 and receives back from location server 150 a location estimate for mobile terminal 120. LCS Client 160 may also be known as a SUPL Agent—e.g. when the location solution used by location server 150 and mobile terminal 120 is SUPL. Mobile terminal 120 may also include an LCS Client or a SUPL agent (not shown in FIG. 1) that may issue a location request to some positioning capable function within Mobile Terminal 120 and later receive back a location estimate for Mobile Terminal 120. The LCS Client or SUPL Agent within Mobile Terminal 120 may perform location services for the user of Mobile Terminal 120—e.g. provide navigation directions or identify points of interest within the vicinity of Mobile Terminal 120.

For simplicity, only one mobile terminal 120 is shown in FIG. 1. As used herein, a mobile terminal refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile terminal" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless and wireline communication devices, computers, laptops, etc. which are capable of communication with a server, such as via the Internet, WiFi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "mobile station." Server 150 as used herein may be a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

The communication procedure used by network architecture 100, as embodied for example in a positioning protocol such as LPP/LPPe, may be used to avoid mobile terminal 120 and server 150 congestion including avoiding interference with other activities such as location and communication activities being performed by the mobile terminal 120 and server 150. The communication procedure may be used by the server 150 to transfer any type of assistance data to a mobile terminal 120 and may be used by the mobile target 120 to transfer any type of location data to the server 150 and applies to both solicited and unsolicited transfers. The communication procedure may be used to transfer data when the amount of data would otherwise result in a message that is too large to transfer using the underlying transport protocol or location protocol. For example, the maximum message size for SUPL may be restricted to less than 65335 octets. For an LPP/LPPe message larger than 60000 octets, and more specifically more than 65335 octets, and to be transferred within a SUPL message, the segmented data transfer in accordance with the present communication procedure may be used. The communication makes use of the LPP reliable transport capabilities defined in LPP.

As illustrated in FIG. 1, the mobile terminal 120 may communicate with a server 150 through a first network 130 and a second network 132, where the server 150 is connected to the second network 132. Mobile terminal 120 communicates with the first network 130 through a first Radio Access Network (RAN) 140, which is associated with the first network 130. If communication with the server 150 through the first network 130 is interrupted (e.g. if mobile terminal 120 loses radio connectivity), communication with the server 150 may be reestablished either through the same network 130 or through a different network, e.g., third network 134 through a second RAN 142, as illustrated by the dotted lines 143.

Mobile terminal 120 may receive and measure signals from the RANs 140 and 142, which may be used for position determination. 140 and 142 Wireless communication networks RANs 140 and 142 may be wireless wide area networks (WWAN), wireless local area networks (WLAN), a wireless personal area networks (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, RAN1 140 may be, e.g., an evolved UMTS Terrestrial Radio Access Network (E-UTRAN) (LTE) network, a W-CDMA UTRAN network, a GSM/EDGE Radio Access Network (GERAN), a 1xRTT network, an Evolution-Data Optimized (EvDO) network, a WiMax network or a WLAN, while RAN2 142 may be one of the above networks that is different than RAN1 140.

In some cases (not shown in FIG. 1), first network 130 and second network 132 and/or second network 132 and third network 134 may be the same network. In some cases (not shown in FIG. 1), one or more of first, second and third networks, 130, 132 and 134 may be a wireline network (e.g. DSL, packet cable) or wireline network with wireless (e.g. WiFi) local access.

Mobile terminal 120 may also receive signals from one or more Earth orbiting satellite vehicles (SVs) 180, which are part of satellite positioning system (SPS). The SVs, for example, may be in a constellation of Global Navigation Satellite System (GNSS) such as Global Positioning System (GPS), Galileo, Glonass or Compass. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou or Compass over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Mobile terminal 120 may measure signals from SVs 180 and/or RANs 140, 142 associated with the first and third networks 130 and 134 and may obtain pseudo-range measurements for the satellites and network measurements from RANs 140, 142. The pseudo-range measurements and/or network measurements may be used to derive a position estimate for mobile terminal 120. The server 150 may be used to provide location related information, such as assistance data, to the mobile terminal 120, which may be used to assist in acquiring and measuring signals from SVs 180 and RANs 140, 142 and/or in deriving a position estimate from these measurements. Additionally, mobile terminal 120 may provide location related information, such as an estimated position or location measurements (e.g., satellite measurements from one or more GNSSs, or network measurements from one or more networks, etc.), to the server 150. Where the data transfer is large, requiring a segmented data transfer, the data transfer may be interrupted when mobile terminal 120 switches from network 130 to third network 134 or loses and then re-establishes communication with network 130 or when server 150 undergoes a temporary communication failure. Accordingly, the segmented data transfer is resumed after reestablishing the connection with server 150.

Figure 2:
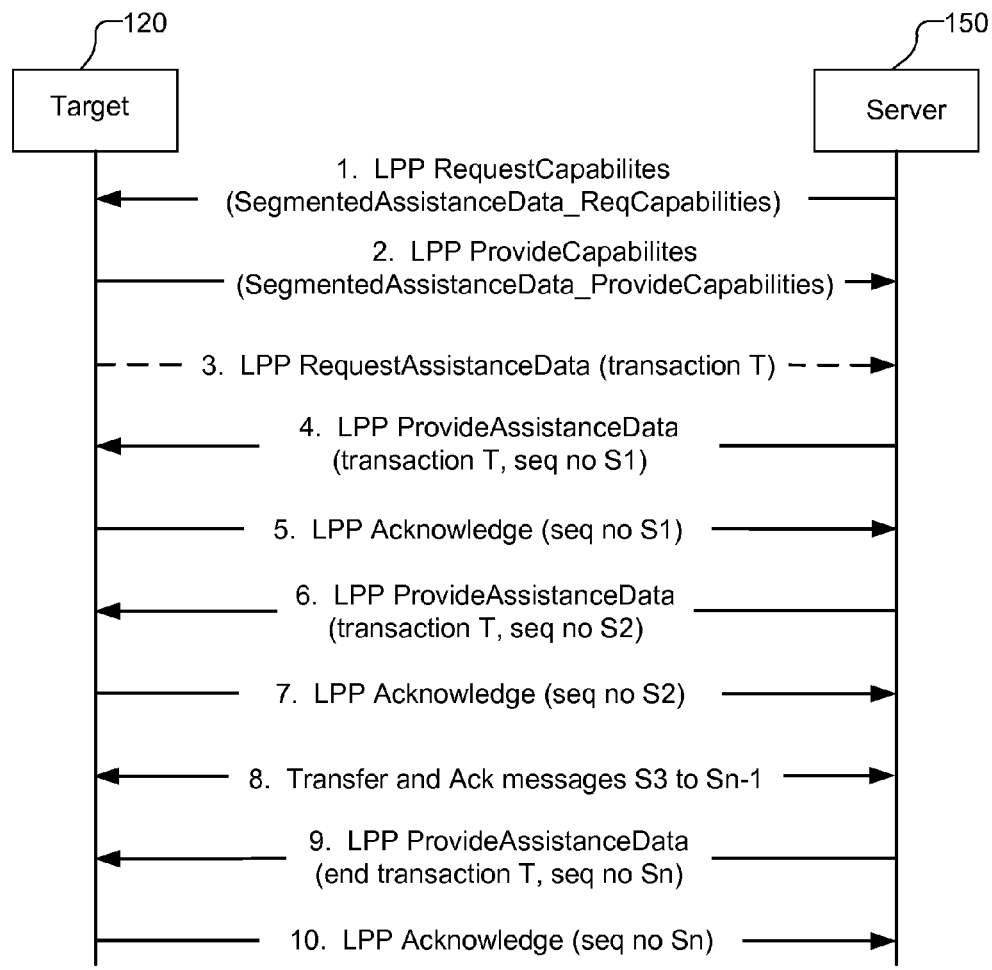
FIG. 2 illustrates a message flow to transfer assistance data from the server to a target using multiple messages.

FIG. 2 illustrates the message flow of a basic procedure that supports transfer of assistance data from the server 150 to the target 120 using a connection and, where applicable, a location session between the target 120 and server 150 that remains established during the entire data transfer. For the sake of example, the message flow is described as LPP/LPPe positioning protocol messages, but it should be understood that other types of messages may be used if desired.

In step 1, if the LPP/LPPe capabilities including the segmented assistance data transfer capabilities of the target 120 are not known to server 150, the server 150 may send a RequestCapabilities message to target 120 in certain aspects of the described embodiments. The RequestCapabilities message includes, among other parameters, a SegmentedAssistanceData_ReqCapabilities parameter, which requests the capabilities of the target 120 to support segmented transfer of assistance data. The target 120 may respond with a ProvideCapabilities message sent to the server 150 in step 2 of the message flow. In certain aspects of the described embodiments, the ProvideCapabilities message may be provided by target 120 unsolicited in step 2 in the absence of a RequestCapabilities message being sent in step 1. In another embodiment, the ProvideCapabilities message in step 2 may be sent instead by target 120 in association with a request for assistance data sent later in step 3. The ProvideCapabilities message includes, among other parameters, a SegmentedAssistanceData ProvideCapabilities parameter to indicate support of segmented transfer of assistance data by target 120. The SegmentedAssistanceData_ProvideCapababilities parameter may include multiple fields including one or more of the following: maxSegments indicating the maximum number of separate LPP messages into which assistance data should be segmented by the server 150; maxSize indicating the maximum overall size of all assistance data that is transferred for segmented transfer that is supported by the target 120 in multiples of e.g., 1024 octets after rounding up to a multiple of e.g., 1024; minSize indicating the minimum overall size of all assistance data for which segmented assistance data transfer should be used by the server 150 in preference to sending all assistance data in a single LPP message; and resume indicating if the target 120 can support segmented transfer with the resume capability, as discussed below.

Steps similar to steps 1 and 2 but with message transfer in the opposite direction may be performed instead of step 1 and 2 or in addition to steps 1 and 2 to transfer the capabilities of server 150 to target 120 to support segmented transfer of assistance data. These steps are not shown in FIG. 2 and, if used, may make use of a reversed LPPe mode whereby a target 120 is enabled to request and receive capabilities from a server 150.

In step 3 of the message flow, the target 120 optionally sends an LPP request for assistance data to the server 150 as part of a new transaction with transaction identifier (ID) T. The target 120 may specify the particular assistance data requested (e.g. GNSS assistance data, map data etc.) and may or may not include a preference to transfer the assistance data in a segmented form. The inclusion of a preference to transfer the assistance data in a segmented form may be based on knowledge by target 120 of server 150 capability to support this (e.g. as obtained when server 150 LPP/LPPe capabilities are transferred to target 120 prior to step 3). The presence or absence of a request for segmented transfer may be ignored by the server 150 in certain aspects of the described embodiments—e.g. the server 150 may choose to use segmented transfer when the target 120 does not request this. In some embodiments, step 3 may not occur and the server 150 may decide to send assistance data to target 120 in subsequent steps unsolicited—e.g. to assist target 120 to support a request for location information sent previously by server 150 to target 120 not shown in FIG. 2.

In step 4 of the message flow, the server 150 obtains and then divides the assistance data to be transferred to the target 120 into n portions. If step 3 was performed, the assistance data usually comprises everything requested by the target 120 that is available to the server 150. Each portion of assistance data should be capable of being transferred in a well formed LPP/LPPe Provide Assistance Data message or other appropriate type of message, (i.e. a message that can be decoded and interpreted independently of any other message). Assistance data that belongs to a parameter defined to be an unstructured octet string in LPP or LPPe may be split between consecutive messages with the different portions concatenated into a single octet string by the target 120 once the consecutive messages have all been received. Some assistance data may be duplicated in two or more separate messages, for example, if portions of assistance data that are transferred in different messages must be accompanied by the same mandatory parameters then these same mandatory parameters would be sent in separate messages and thus duplicated. In that case, all appearances of the same mandatory parameter may contain identical data in one aspect of the described embodiment. Optional parameters that appear in more than one segment may include the same values in each appearance or may be included in only one appearance in certain aspects of the described embodiment. Other assistance data may need to be split into different messages carrying the same parameters but with different data—e.g. assistance data related to different GNSS SVs. The server 150 sends the first portion of assistance data in an LPP message carrying a reliable transport sequence number S1. The reliable transport sequence number parameter may be the same sequence number parameter that is used to support reliable transport of LPP messages as defined in 3GPP TS 36.355. The message includes a transaction ID T that is the same as in step 3, if step 3 occurred, and does not indicate that transaction T is ended. The message requests an LPP reliable transport acknowledgment. The decision by server 150 to transfer the assistance data in a segmented form to target 120 may be partly based on a specific preference in step 3 if step 3 occurred or may be based on knowledge by server 150 of target 120 capability to support this (e.g. as obtained when target 120 LPP/LPPe capabilities are transferred to server 150 in step 2). Another factor in this decision may be that the overall size of all the assistance data is large.

In step 5 of the message flow, the target 120 recognizes that the assistance data will be transferred in a sequence of LPP messages from the indication in step 4 that the transaction T is not ended. The target 120 acknowledges receipt of the message in step 4 by returning an LPP reliable transport acknowledgment (which is not piggybacked on a normal LPP message in one aspect of the described embodiment). The LPP reliable transport acknowledgment message may be the same acknowledgment message that is defined in 3GPP TS 36.355 to support LPP reliable transport and may be a small message that contains the transaction ID T and sequence S1 that is being acknowledged. The target 120 may use the LPP acknowledgment to control the message flow, e.g., the target 120 may delay sending the acknowledgment to the server 150 until the target 120 is ready to receive the next message (sent in step 6). The LPP acknowledgment may only confirm receipt of the message in step 4 and does not necessarily confirm that the message was correct (e.g. decodable).

In step 6 of the message flow, after receiving the acknowledgment in step 5, the server 150 sends the second portion of assistance data in an LPP message carrying a new sequence number S2, which may be different than S1, and requesting acknowledgment. If the server 150 does not receive the acknowledgment in step 5 after a timeout period, the server 150 may retransmit the LPP message in step 4, e.g., as described to support LPP reliable transport in 3GPP TS 36.355. The target 120 discards any duplicate LPP messages, such as a retransmission of the message in step 4 in the case that the original transmission in step 4 was correctly received, but may still return an acknowledgment to the server 150 in certain aspects of the described embodiment. A retransmission may be recognized by use of the same sequence number—e.g. use of sequence number S1 for a retransmission of the message in step 4.

In step 7 of the message flow, the target 120 acknowledges receipt of the message in step 6 with an LPP acknowledgment.

In step 8 of the message flow, the server 150 transfers and the target 120 acknowledges assistance data contained in LPP messages with sequence numbers S3 to Sn−1 (which may each be different—e.g. monotonically increasing modulo the sequence size) by repeating steps 6 and 7. At any time during the transfer, either end may abort the transfer by sending an e.g., LPP Abort message to the other end. If the target 120 detects an error in any received LPP message from the server 150, it may return an LPP Error message indicating the error, which may also terminate the transfer.

In step 9 of the message flow, the server 150 transfers the last ($n^{th}$) portion of assistance data in an LPP message with sequence number Sn and requests an acknowledgment. The server 150 also includes an indication that this message ends transaction T.

In step 10 of the message flow, the target 120 acknowledges the message in step 9.

In FIG. 2, either end, i.e., target 120 or server 150, may control the rate of flow of LPP messages. The server 150 may control the flow by delaying the sending of subsequent LPP messages after receiving an acknowledgment from the target 120. For example, the server 150 may delay sending the LPP message in step 6 after receiving the acknowledgment in step 5. The server 150 may additionally control the flow by dynamically controlling the message size, as segmentation decisions, e.g., the number of segmentations and size of the segmentations, can be made on the fly as well as statically in advance. The target 120 may control the flow by delaying the return of acknowledgments which will force the server 150 to delay sending subsequent LPP messages—e.g. the target 120 can delay sending the acknowledgment in step 7 after receiving the LPP message in step 6. The server 150 may retransmit an unacknowledged LPP message after a certain timeout period and, accordingly, the target 120 may limit the delay in acknowledgment to avoid an unnecessary retransmission. Alternatively, the target 120 can allow an unnecessary retransmission in order to delay the acknowledgment by an extended period, although the extended period will cost the additional unnecessary retransmission and still must be not so long that the server 150 aborts the transfer.

Figure 3:
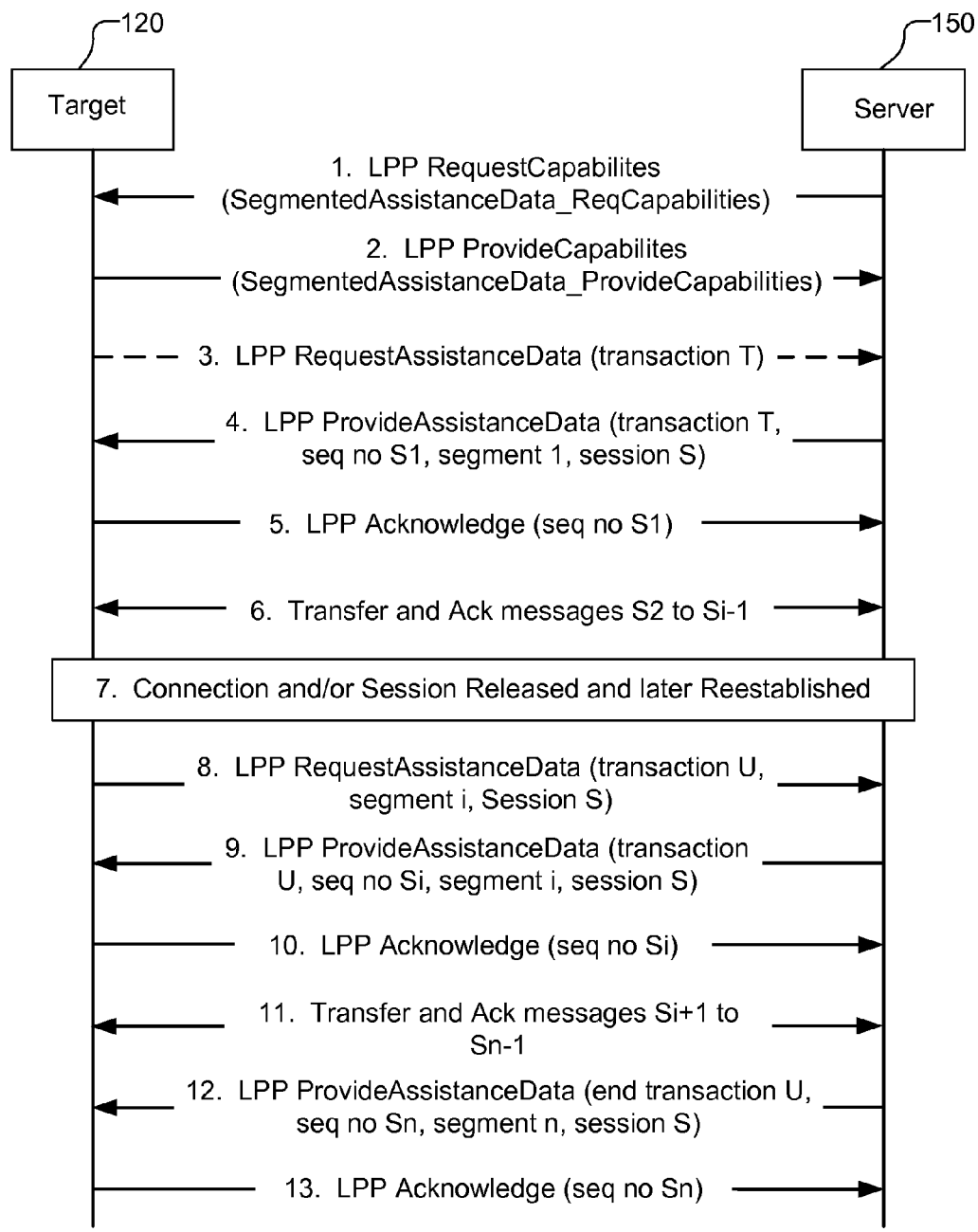
FIG. 3 illustrates a message flow similar to that shown in FIG. 2, but with the resume capability.

FIG. 3 illustrates the message flow similar to that shown in FIG. 2, but with the resume capability, so that segmented assistance data transfer can be successful even when the connection and/or session between the target 120 and server 150 are released and later reestablished before the transfer is complete.

Step 1 and step 2 in the message flow of FIG. 3 are the same as steps 1 and 2 shown in FIG. 2, except that in step 2 the target 120 may indicate to the server 150 that it can support segmented transfer of assistance data with the resume capability. In step 3 of the message flow, the target 120 optionally sends an LPP request for assistance data to the server 150 as part of a new transaction with transaction ID T. The target 120 may include a preference to transfer the assistance data in a segmented form with resume capability. The inclusion of a preference to transfer the assistance data in a segmented form with resume capability may be based on knowledge by target 120 of server 150 capability to support this (e.g. as obtained if server 150 LPP/LPPe capabilities are transferred to target 120 prior to step 3).

Step 4 of the message flow may be the same as step 4 in the message flow of FIG. 2, except that the server 150 decides to use segmented transfer of assistance data with a resume capability and, to support this, assigns a unique session ID S to the whole transfer and includes this in the first LPP Provide Assistance Data message together with an indication that this is the first segment of assistance data. The decision by server 150 to transfer the assistance data in a segmented form with a resume capability to target 120 may be based on a specific preference in step 3 if step 3 occurred or may be based on knowledge by server 150 of target 120 capability to support this (e.g. as obtained if target 120 LPP/LPPe capabilities are transferred to server 150 in step 2). Other factors for the decision to transfer the assistance data in a segmented form may be, e.g., the size of the assistance data, connection bandwidth, expected connection reliability, known capability of the target 120 to receive data in a controlled manner, availability of only some of the assistance data at the initiation of the transfer and availability of the rest of the assistance data later in the transfer, and preference to send data at a lower rate over a longer period (e.g. to avoid network congestion) as opposed to sending all data at a high rate.

Step 5 of the message flow is the same as step 5 in FIG. 2.

In step 6 of the message flow, the server 150 continues to transfer more assistance data to the target 120 and the target acknowledges receipt as described for FIG. 2. The server 150 may include the session ID S in each subsequent Provide Assistance Data message and includes the segment number, e.g., segments 2 to i−1. If retransmission occurs, message contents remain the same as for the first transmission (including the sequence number and segment number).

In step 7 of the message flow, the connection (e.g. secure IP connection) and/or session (e.g. SUPL session) between the target 120 and server 150 are released or fail prematurely. The connection and/session are later re-established, e.g. in order to complete the assistance data transfer or for other reasons.

In step 8 of the message flow, the target 120 recognizes that the session and/or connection have been restored, and sends an LPP Request Assistance Data message to the server 150 containing the session ID S and the segment number i of the next expected LPP Provide Assistance Data message. The message may not contain a request for other assistance data. The transaction ID U for this message need not be the same as the previous transaction ID T.

In step 9 of the message flow, the server 150 recognizes that the message received in step 8 refers to the transfer of assistance data started in step 3 or step 4 due to the inclusion of the session ID S. The server 150 then resumes the assistance data transfer interrupted by step 7 by sending the $i^{th}$ portion of assistance data in an LPP Provide Assistance Data message carrying the transaction ID U, a sequence number Si, the session ID S and an indication that this is the $i^{th}$ segment. The message also requests an acknowledgment. If the server 150 does not receive the request in step 8, e.g. because the target 120 is not aware that the connection and/or session have been restored to the same server 150, the server 150 may resume the assistance transfer unsolicited. When resumption of the transfer is unsolicited, the server 150 begins by sending or resending either LPP message i if message i−1 was acknowledged before step 7 or message i−1 if the acknowledgment for i−1 did not reach the server 150 before step 7. If the server 150 had aborted the transfer, e.g. due to a long timeout period during step 7, the server 150 may return an LPP Error message instead of the next assistance data segment after it receives the message in step 8 and the remaining steps are omitted. If steps 8 and 9 occur in parallel, the server 150 may return an LPP Error for step 8 and the target 120 continues from step 9.

In step 10 of the message flow, the target 120 returns an acknowledgment for the message in step 9 and discards the message if this was already received just before step 7. If the target 120 had aborted the transfer, e.g. due to a long timeout period in step 7, the target 120 may instead return an LPP Error message to the server 150 after it receives the message in step 9 and the remaining steps are omitted.

In step 11 of the message flow, the server 150 transfers segments i+1 to n−1 to the target 120 and the server 150 acknowledges receipt of each message as described for FIG. 2.

Step 12 of the message flow is similar to step 9 in FIG. 2, except that the server 150 may include the session ID S and the segment number n.

In step 13 of the message flow, the target 120 acknowledges the message in step 12.

Support of flow control by either end in FIG. 3 may be the same as that described for FIG. 2.

Figure 4:
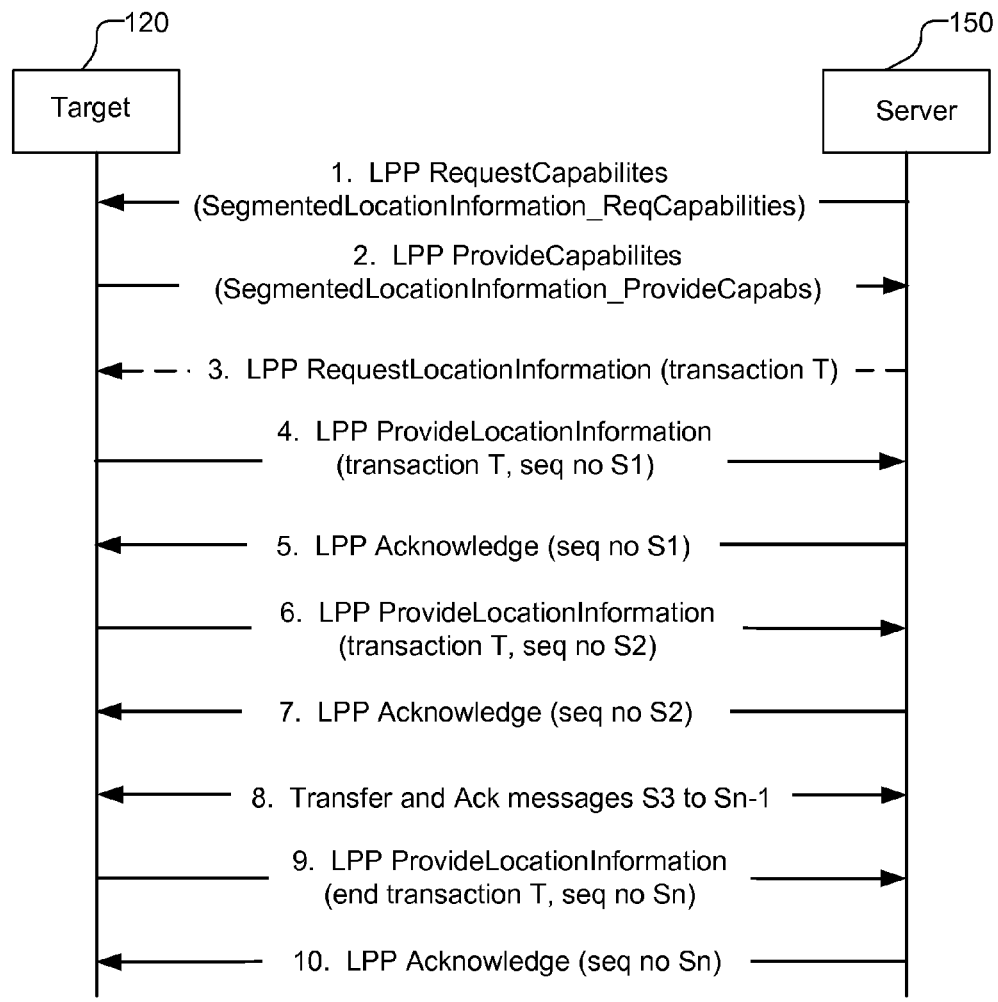
FIG. 4 illustrates a message flow to transfer location information from a target to a server using multiple messages.

FIG. 4 illustrates the message flow of a basic procedure that supports transfer of location information from the target 120 to the server 150 using a connection and, where applicable, a location session between the target 120 and server 150 that remains established during the entire data transfer. For the sake of example, the message flow is described as LPP/LPPe messages, but it should be understood that other types of messages may be used if desired.

If the LPP/LPPe capabilities including the segmented location information transfer capabilities of the target 120 are not known to the server 150, the server 150 may send a RequestCapabilities message to the target 120 in step 1 of the message flow in certain aspects of the described embodiments. The RequestCapabilities message includes, among other parameters, a SegmentedLocationInformation_ReqCapabilities parameter, which requests the capabilities of the target 120 to support segmented transfer of location information. The target 120 may respond with a ProvideCapabilities message sent to the server 150 in step 2 of the message flow. In certain aspects of the described embodiments, the ProvideCapabilities message may be provided by target 120 unsolicited in step 2 in the absence of a RequestCapabilities message being sent in step 1. The ProvideCapabilities message may include, among other parameters, a SegmentedLocationInformation_ProvideCapabs parameter to indicate support of segmented transfer of location information. The SegmentedLocationInformation_ProvideCapabs parameter may include multiple fields including one or more of the following: maxSegments indicating the maximum number of separate LPP messages into which location information can be segmented by the target 120; maxSize indicating the maximum overall size of all location information that can be transferred for segmented transfer that is supported by the target 120 in multiples of e.g., 1024 octets after rounding up to a multiple of e.g., 1024; minSize indicating the minimum overall size of all location information for which segmented location information transfer is preferred by the target 120 in preference to sending all location information in a single LPP message; and resume indicating if the target 120 can support segmented transfer with the resume capability, as discussed below.

Steps similar to steps 1 and 2 but with message transfer in the opposite direction may be performed instead of step 1 and 2 or in addition to steps 1 and 2 to transfer the capabilities of server 150 to target 120 to support segmented transfer of location information. These steps are not shown in FIG. 4 and, if used, may make use of a reversed LPPe mode whereby a target 120 is enabled to request and receive capabilities from a server 150.

In step 3 of the message flow, the server 150 optionally sends an LPP request for location information to the target 120 as part of a new transaction with transaction identifier (ID) T. The server 150 may specify the particular location information requested (e.g. GNSS measurements, WiFi measurements, a location estimate etc.) and may or may not include a preference to transfer the location information in a segmented form. The inclusion of a preference to transfer the location information in a segmented form may be based on knowledge by server 150 of target 120 capability to support this (e.g. as obtained when target 120 LPP/LPPe capabilities are transferred to server 150 in step 2). The presence or absence of a request for segmented transfer may be ignored by the target 120 in certain aspects of the described embodiments—e.g. the target 120 may choose to use segmented transfer when the server 150 does not request this. In some embodiments, step 3 may not occur and the target 120 may decide to send location information to server 150 in subsequent steps unsolicited—e.g. to assist server 150 to obtain a location estimate for target 120 and/or to assist server 150 in selecting suitable assistance data to send to target 120.

In step 4 of the message flow the target 120 obtains and then divides the location information to be transferred to the server 150 into n portions. If step 3 was performed, the location information usually comprises everything requested by the server 150 that is available to or can be obtained by the target 120. Each portion of location information should be capable of being transferred in a well formed LPP/LPPe Provide Location information message or other appropriate type of message, (i.e. a message that can be decoded and interpreted independently of any other message). Location information that belongs to a parameter defined to be an unstructured octet string in LPP or LPPe may be split between consecutive messages with the different portions concatenated into a single octet string by the server 150 once the consecutive messages have all been received. Some location information may be duplicated in two or more separate messages, for example, if portions of location information that are transferred in different messages must be accompanied by the same mandatory parameters then these same mandatory parameters would be sent in separate messages and thus duplicated. In that case all appearances of the same mandatory parameter may contain identical data in one aspect of the described embodiment. Optional parameters that appear in more than one segment may include the same values in each appearance or may be included in only one appearance in certain aspects of the described embodiment. Other location information may need to be split into different messages carrying the same parameters but with different data—e.g. location information related to different GNSS SVs, different GNSSs, or different networks, etc. The target 120 sends the first portion of location information in an LPP message carrying a reliable transport sequence number S1. The reliable transport sequence number parameter may be the same sequence number parameter that is used to support reliable transport of LPP messages as defined in 3GPP TS 36.355. The message includes a transaction ID T that is the same as in step 3 if step 3 occurred and does not indicate that transaction T is ended. The message requests an LPP reliable transport acknowledgment. The decision by target 120 to transfer the location information in a segmented form to server 150 may be partly based on a specific preference in step 3 if step 3 occurred or may be based on knowledge by target 120 of server 150 capability to support this (e.g. as obtained when server 150 LPP/LPPe capabilities are transferred to target 120 prior to step 4). Other factors for the decision to transfer the location data in a segmented form may be, e.g., the size of the location data, connection bandwidth, expected connection reliability, known capability of the server 150 to receive data in a controlled manner, availability of only some of the location data at the initiation of the transfer and availability of the rest of the location data later in the transfer, and preference to send data at a lower rate over a longer period (e.g. to avoid network congestion) as opposed to sending all data at a high rate.

In step 5 of the message flow, the server 150 recognizes that the location information will be transferred in a sequence of LPP messages from the indication in step 4 that the transaction T is not ended. The server 150 acknowledges receipt of the message in step 4 by returning an LPP reliable transport acknowledgment (which is not piggybacked on a normal LPP message in one aspect of the described embodiment). The LPP reliable transport acknowledgment message may be the same acknowledgment message that is defined in 3GPP TS 36.355 to support LPP reliable transport and may be a small message that contains the transaction ID T and sequence S1 that is being acknowledged. The server 150 may use the LPP acknowledgment to control the message flow, e.g., the server 150 may delay sending the acknowledgment to the target 120 until the server 150 is ready to receive the next message (sent in step 6). The LPP acknowledgment may only confirm receipt of the message in step 4 and does not necessarily confirm that the message was correct (e.g. decodable).

In step 6 of the message flow, after receiving the acknowledgment in step 5, the target 120 sends the second portion of location information in an LPP message carrying a new sequence number S2, which should be different to S1 in a preferred embodiment, and requesting acknowledgment. If the target 120 does not receive the acknowledgment in step 5 after a timeout period, the target 120 may retransmit the LPP message in step 4 as described to support LPP reliable transport in 3GPP TS 36.355. The server 150 discards any duplicate LPP messages, such as a retransmission of the message in step 4 in the case that the original transmission in step 4 was correctly received, but may still return an acknowledgment to the target 120 in certain aspects of the described embodiment. A retransmission may be recognized by use of the same sequence number—e.g. use of sequence number S1 for a retransmission of the message in step 4.

In step 7 of the message flow, the server 150 acknowledges receipt of the message in step 6 with an LPP acknowledgment.

In step 8 of the message flow, the target 120 transfers and the server 150 acknowledges location information contained in LPP messages with sequence numbers S3 to Sn−1 (which may each be different—e.g. monotonically increasing modulo the sequence size) by repeating steps 6 and 7. At any time during the transfer, either end may abort the transfer by sending an e.g., LPP Abort message to the other end. If the server 150 detects an error in any received LPP message from the target 120, it may return an LPP Error message indicating the error, which may also terminate the transfer.

In step 9, of the message flow, the target 120 transfers the last ($n^{th}$) portion of location information in an LPP message with sequence number Sn and requests an acknowledgment. The target 120 also includes an indication that this message ends transaction T.

In step 10 of the message flow, the server 150 acknowledges the message in step 9.

In FIG. 4, either end, i.e., target 120 or server 150, may control the rate of flow of LPP messages. The target 120 may control the flow by delaying the sending of subsequent LPP messages after receiving an acknowledgment from the server 150. For example, the target 120 may delay sending the LPP message in step 6 after receiving the acknowledgment in step 5. The target 120 may additionally control the flow by dynamically controlling the message size, as segmentation decisions, e.g., the number of segmentations and size of the segmentations, can be made on the fly as well as statically in advance. The server 150 may control the flow by delaying the return of acknowledgments which will force the target 120 to delay sending subsequent LPP messages—e.g. the server 150 can delay sending the acknowledgment in step 7 after receiving the LPP message in step 6. The target 120 may retransmit an unacknowledged LPP message after a certain timeout period and, accordingly, the server 150 may limit the delay in acknowledgment to avoid an unnecessary retransmission. Alternatively, the server 150 can allow an unnecessary retransmission in order to delay the acknowledgment by an extended period, although the extended period will cost the additional unnecessary retransmission and still must be not so long that the target 120 aborts the transfer.

Figure 5:
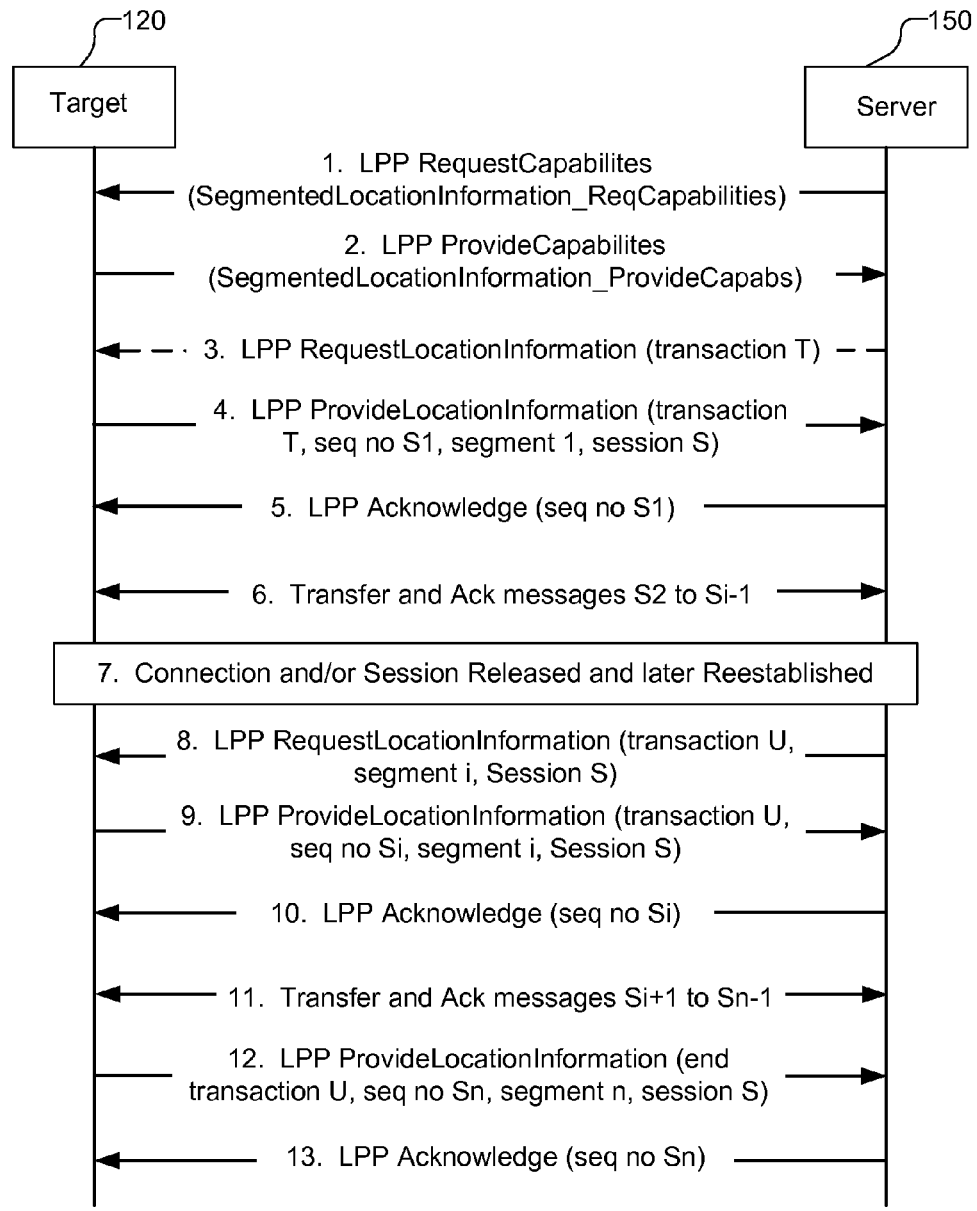
FIG. 5 illustrates a message flow similar to that shown in FIG. 4, but with the resume capability.

FIG. 5 illustrates the message flow similar to that shown in FIG. 4, but with the resume capability, so that segmented location information transfer can be successful even when the connection and/or session between the target 120 and server 150 are released and later reestablished before the transfer is complete.

Step 1 and step 2 in the message flow of FIG. 5 are the same as steps 1 and 2 shown in FIG. 4 except that in step 2 the target 120 may indicate to the server 150 that it can support segmented transfer of location information with the resume capability. In step 3 of the message flow, the server 150 optionally sends an LPP request for location information to the target 120 as part of a new transaction with transaction ID T. The server 150 may include a preference to transfer the location information in a segmented form with resume capability. The inclusion of a preference to transfer the location information in a segmented form with resume capability may be based on knowledge by server 150 of target 120 capability to support this (e.g. as obtained if target 120 LPP/LPPe capabilities are transferred to server 150 in step 2).

Step 4 of the message flow may be the same as step 4 in the message flow of FIG. 4, except that the target 120 decides to use segmented transfer of location information with a resume capability and, to support this, assigns a unique session ID S to the whole transfer and includes this in the first LPP Provide Location information message together with an indication that this is the first segment of location information. The decision by target 120 to transfer the location information in a segmented form with a resume capability to server 150 may be based on a specific preference in step 3 if step 3 occurred or may be based on knowledge by target 120 of server 150 capability to support this (e.g. as obtained when server 150 LPP/LPPe capabilities are transferred to target 120 prior to step 4). Another factor in this decision may be that the overall size of all the location information is large.

Step 5 of the message flow is the same as step 5 in FIG. 4.

In step 6 of the message flow, the target 120 continues to transfer more location information to the server 150 and the server 120 acknowledges receipt as described for FIG. 4. The target 120 may include the session ID S in each subsequent Provide Location Information message and includes the segment number, e.g., segments 2 to i−1. If retransmission occurs, message contents remain the same as for the first transmission (including the sequence number and segment number).

In step 7, the connection (e.g. secure IP connection) and/or session (e.g. SUPL session) between the server 150 and target 120 are released or fail prematurely. The connection and/session are later re-established, e.g. in order to complete the location information transfer or for other reasons.

In step 8 of the message flow, the server 150 recognizes that the session and/or connection have been restored, and sends an LPP Request Location information message to the target 120 containing the session ID S and the segment number i of the next expected LPP Provide Location information message. The message may not contain a request for other location information. The transaction ID U for this message need not be the same as the previous transaction ID T.

In step 9 of the message flow, the target 120 recognizes that the message received in step 8 refers to the transfer of location information started in step 3 or step 4 due to the inclusion of the session ID S. The target 120 then resumes the location information transfer interrupted by step 7 by sending the $i^{th}$ portion of location information in an LPP Provide Location information message carrying the transaction ID U, a sequence number Si, the session ID S and an indication that this is the $i^{th}$ segment. The message also requests an acknowledgment. If the target 120 does not receive the request in step 8, e.g. because the server 150 is not aware that the connection and/or session have been restored to the same target 120, the target 120 may resume the location information transfer unsolicited. When resumption of the transfer is unsolicited, the target 120 begins by sending or resending either LPP message i if message i−1 was acknowledged before step 7 or message i−1 if the acknowledgment for i−1 did not reach the target 120 before step 7. If the target 120 had aborted the transfer, e.g. due to a long timeout period during step 7, the target 120 returns an LPP Error message instead of the next location information segment after it receives the message in step 8 and the remaining steps are omitted. If steps 8 and 9 occur in parallel, the target 120 returns an LPP Error for step 8 and the server 150 continues from step 9.

In step 10 of the message flow, the server 150 returns an acknowledgment for the message in step 9 and discards the message if this was already received just before step 7. If the server 150 had aborted the transfer, e.g. due to a long timeout period in step 7, the server 150 may instead return an LPP Error message to the target 120 after it receives the message in step 9 and the remaining steps are omitted.

In step 11 of the message flow, the target 120 transfers segments i+1 to n−1 to the server 150 and the target 120 acknowledges receipt as described for FIG. 4.

Step 12 of the message flow is similar to step 9 for FIG. 4, except that the target 120 may include the session ID S and shall include the segment number n.

In step 13 of the message flow, the server 150 acknowledges the message in step 12.

Support of flow control by either end in FIG. 5 may be the same as that described for FIG. 4.

Figure 6:
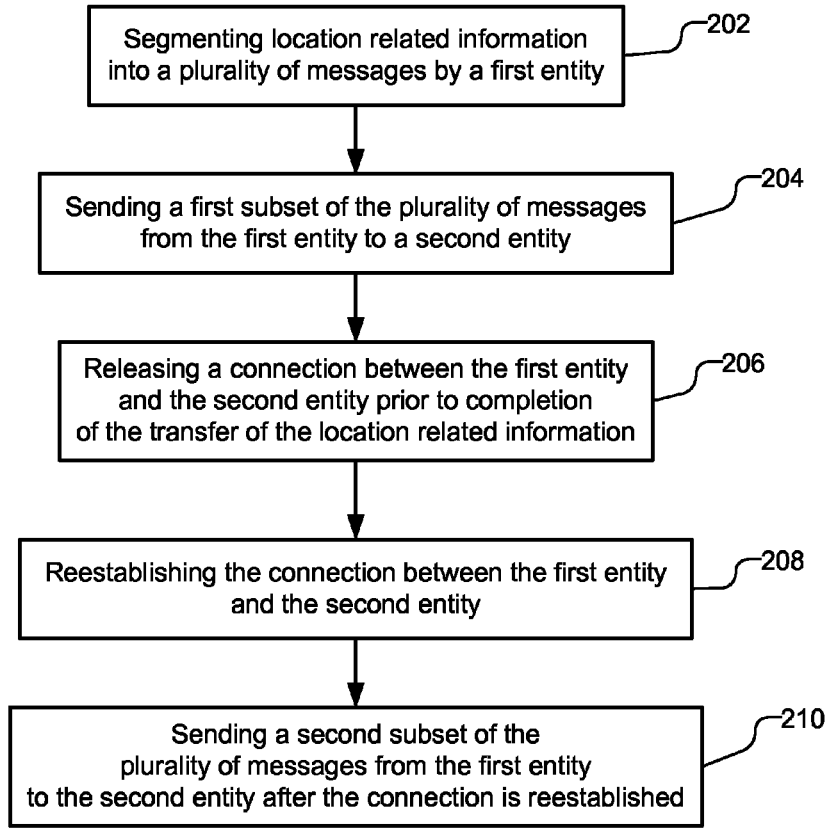
FIG. 6 is a flow chart illustrating a method of transferring location related information from a first entity to a second entity using multiple messages where the transfer is resumed after the connection between the entities is released and reestablished.

FIG. 6 is a flow chart illustrating a method of transferring location related information from a first entity to a second entity using multiple messages where the transfer is resumed after the connection between the entities is released and reestablished. The location related information may be, e.g., assistance data transferred from a server 150 to a mobile terminal 120 or location information transferred from a mobile terminal 120 to a server 150. As illustrated, the first entity, which may be the server 150 or target 120, segments the location related information into a plurality of messages (202), which may be performed after receiving a request for the location related information from the second entity. The first entity sends a first subset of the plurality of messages to the second entity (204). The connection between the first entity and the second entity is released prior to completion of the transfer of the location related information (206) and is reestablished (208). The transfer of the location related information is resumed by sending a second subset of the plurality of messages, e.g., the remaining unreceived messages, from the first entity to the second entity after the connection is reestablished (210). The method may further include the first entity receiving an indication from the second entity of the next message to be sent by the first entity after the connection is reestablished, where the first entity resumes the transfer of the location related information by sending the next message to the second entity. The second entity may provide an acknowledgement message to the first entity after successfully receiving each message from the first entity, where the first entity resumes the transfer of the location related information by sending the next message with respect to the last message acknowledged by the second entity.

Figure 7:
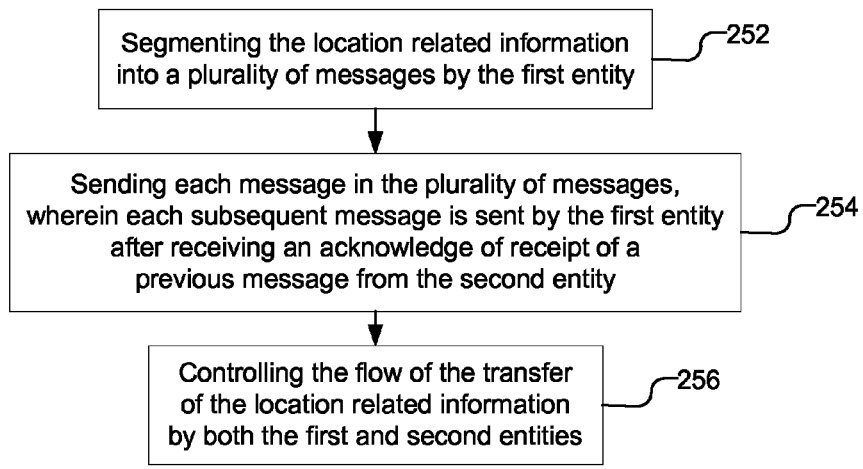
FIG. 7 is a flow chart illustrating a method of transferring location related information from a first entity to a second entity with flow control.

FIG. 7 is a flow chart illustrating a method of transferring location related information from a first entity to a second entity with flow control. As illustrated, the first entity, which may be the server 150 or target 120, segments the location related information into a plurality of messages by the first entity (252), which may be performed after request for the location related information from the second entity. The first entity sends each message in the plurality of messages to the second entity after receiving an acknowledgment of receipt of a previous message from the second entity (254). Both the first entity and the second entity may control the flow of the transfer of the location related information (256). The first entity controls the flow by delaying the sending of one or more of the messages and/or by dynamically controlling the size of each message, and the second entity controls the flow by delaying the sending of one or more acknowledgements of receipt.

Figure 8:
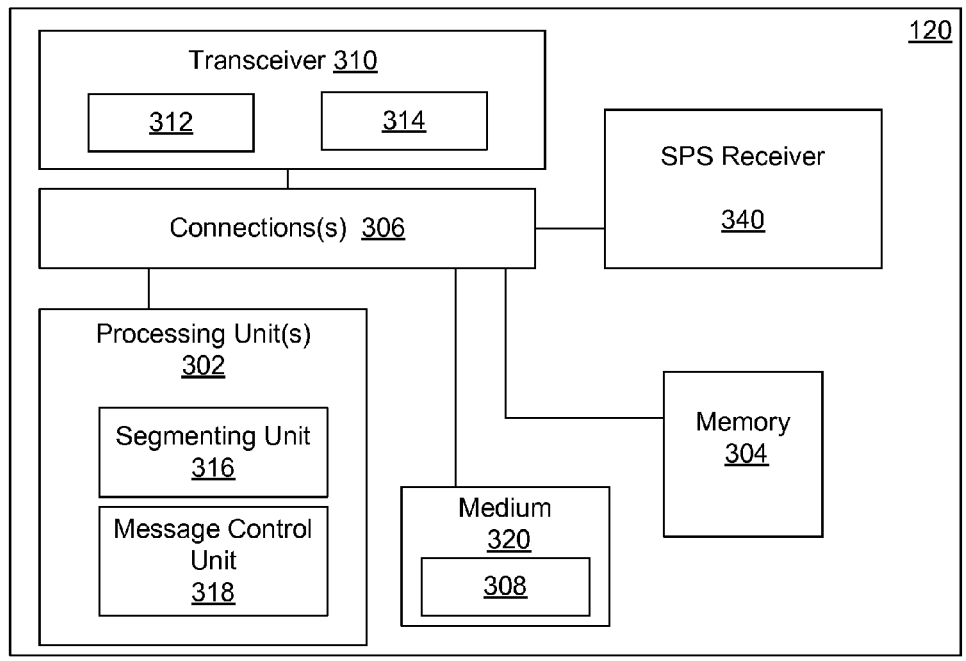
FIGS. 8 and 9 are schematic block diagrams illustrating a mobile terminal and a server, respectively, enabled to support the transfer of segmented location related information with resume capabilities.

Reference is now made to FIG. 8, which is a schematic block diagram illustrating certain example features of mobile terminal 120 enabled to support the transfer of segmented location related information with resume capabilities as described herein. Mobile terminal 120 may, for example, include one or more processing units 302, memory 304, a transceiver 310 (e.g., wireless network interface), and (as applicable) an SPS receiver 340, which may be operatively coupled with one or more connections 306 (e.g., buses, lines, fibers, links, etc.). In certain example implementations, all or part of mobile terminal 120 may take the form of a chipset, and/or the like. The SPS receiver 340 may be enabled to receive signals associated with one or more SPS resources. Transceiver 310 may, for example, include a transmitter 312 enabled to transmit one or more signals over one or more types of wireless communication networks and a receiver 314 to receive one or more signals transmitted over the one or more types of wireless communication networks.

Processing unit 302 may be implemented using a combination of hardware, firmware, and software. The processing unit 302 may include a segmenting unit 316 that segments the location information into a plurality of LPP ProvideLocationInformation messages. The processing unit 302 may further include a message control unit 318 that sends LPP ProvidelocationInformation messages to a server and sends subsequent LPP ProvidelocationInformation messages after a connection with the server is released and reestablished. Additionally, the message control unit 310 may control the flow of transfer by delaying sending LPP ProvideLocationInformation messages until after receipt of an LPP Acknowledgment message from a server 150. The processing unit 302 may represent one or more circuits configurable to perform at least a portion of a data signal computing procedure or process related to the operation of motile terminal 120.

The methodologies described herein in flow charts and message flows may be implemented by various means depending upon the application. For example, these methodologies may be implemented in hardware, firmware, software, or any combination thereof. For a hardware implementation, the processing unit 302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 320 or memory 304 that is connected to and executed by processor unit 302. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions 308 or code on a non-transitory computer-readable medium, such as medium 320 and/or memory 304. Examples include computer-readable media encoded with a data structure and computer-readable media encoded with a computer program. For example, the non-transitory computer-readable medium including program code stored thereon may include program code to segment location related information into a plurality of messages; program code to sequentially send each message of the plurality of messages to a second entity, and program code to send remaining messages in the plurality of messages to the second entity after a connection with the second entity is released and reestablished prior to completion of a transfer of the location related information. The computer-readable medium may further include program code to program code to send each subsequent message to the second entity after receiving an acknowledgement of receipt of a previous message from the second entity; and program code to delay of one or more messages to control the flow of the transfer of the location related information. The computer-readable medium may further include program code to send a next message (i) with respect to the message (i−1) to the second entity to resume the transfer of the location related information after the connection is reestablished, wherein a last acknowledgement of receipt received from the second entity prior to the connection being released is for a message (i−1). The computer-readable medium may further include program code to receive from the second entity an identification of a next message (i) to be sent after the connection is reestablished and program code to send the next message (i) identified by the second entity to resume the transfer of the location related information after the connection is reestablished. Non-transitory computer-readable media includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Memory 304 may represent any data storage mechanism. Memory 304 may include, for example, a primary memory and/or a secondary memory. Primary memory may include, for example, a random access memory, read only memory, etc. While illustrated in this example as being separate from processing unit 302, it should be understood that all or part of a primary memory may be provided within or otherwise co-located/coupled with processing unit 302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 320. As such, in certain example implementations, the methods and/or apparatuses presented herein may take the form in whole or part of a computer-readable medium 320 that may include computer implementable instructions 308 stored thereon, which if executed by at least one processing unit 302 may be operatively enabled to perform all or portions of the example operations as described herein. Computer readable medium 320 may be a part of memory 304.

Figure 9:
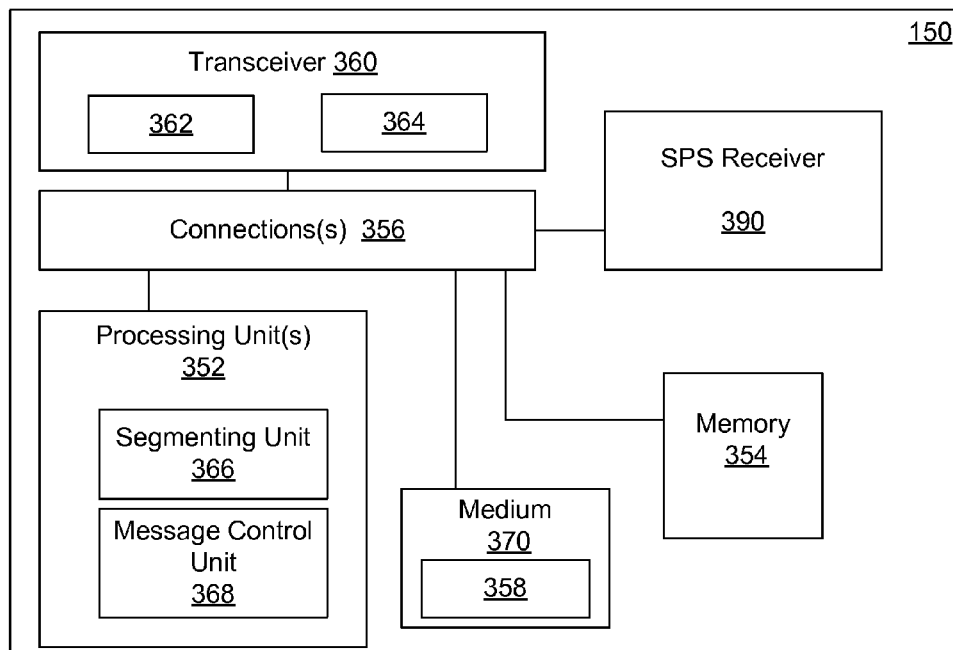

Reference is now made to FIG. 9, which is a schematic block diagram illustrating certain example features of a server 150 enabled to support the transfer of segmented location related information with resume capabilities as described herein. Similar to mobile terminal 120, described above, server 150 may, for example, include one or more processing units 352, memory 354, a transceiver 360 (e.g., wireline or wireless network interface), and (as applicable) an SPS receiver 390, which may be operatively coupled with one or more connections 356 (e.g., buses, lines, fibers, links, etc.). In certain example implementations, all or part of server 150 may take the form of a chipset, and/or the like. Transceiver 360 may include a transmitter 362 and a receiver 364 that support wired transmission and/or reception and, if desired, may additionally or alternatively support transmission and reception of one or more signals over one or more types of wireless communication networks.

Processing unit 352 may be implemented using a combination of hardware, firmware, and software. The processing unit 352 may include a segmenting unit 366 that segments the assistance data into a plurality of LPP ProvideAssistanceData messages. The processing unit 352 may further include a message control unit 368 that sends LPP ProvideAssistanceData messages to a target and sends subsequent LPP ProvideAssistanceData messages after a connection with the target is released and reestablished. Additionally, the message control unit 360 may control the flow of transfer by delaying sending LPP ProvideAssistanceData messages until after receipt of an LPP Acknowledgment message from a target 120.

Thus, for example, processing unit 352 may represent one or more circuits configurable to perform at least a portion of a data signal computing procedure or process related to the operation of server 150.

The methodologies described herein in flow charts and message flows may be implemented by various means depending upon the application. For example, these methodologies may be implemented in hardware, firmware, software, or any combination thereof. For a hardware implementation, the processing unit 352 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 370 or memory 354 that is connected to and executed by processor unit 352. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions 358 or code on a non-transitory computer-readable medium, such as medium 370 and/or memory 354. Examples include computer-readable media encoded with a data structure and computer-readable media encoded with a computer program. For example, the non-transitory computer-readable medium including program code stored thereon may include program code to segment location related information into a plurality of messages; program code to sequentially send each message of the plurality of messages to a second entity, and program code to send remaining messages in the plurality of messages to the second entity after a connection with the second entity is released and reestablished prior to completion of a transfer of the location related information. The computer-readable medium may further include program code to program code to send each subsequent message to the second entity after receiving an acknowledgement of receipt of a previous message from the second entity; and program code to delay of one or more messages to control the flow of the transfer of the location related information. The computer-readable medium may further include program code to send a next message (i) with respect to the message (i−1) to the second entity to resume the transfer of the location related information after the connection is reestablished, wherein a last acknowledgement of receipt received from the second entity prior to the connection being released is for a message (i−1). The computer-readable medium may further include program code to receive from the second entity an identification of a next message (i) to be sent after the connection is reestablished and program code to send the next message (i) identified by the second entity to resume the transfer of the location related information after the connection is reestablished. Non-transitory computer-readable media includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Memory 354 may represent any data storage mechanism. Memory 354 may include, for example, a primary memory and/or a secondary memory. Primary memory may include, for example, a random access memory, read only memory, etc. While illustrated in this example as being separate from processing unit 352, it should be understood that all or part of a primary memory may be provided within or otherwise co-located/coupled with processing unit 352. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 370. As such, in certain example implementations, the methods and/or apparatuses presented herein may take the form in whole or part of a computer-readable medium 370 that may include computer implementable instructions 358 stored thereon, which if executed by at least one processing unit 352 may be operatively enabled to perform all or portions of the example operations as described herein. Computer readable medium 370 may be a part of memory 354.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of transferring assistance data from a server to a target, the method comprising:
   segmenting the assistance data into a plurality of Long Term Evolution Positioning Protocol (LPP) ProvideAssistanceData messages by the server;
   sending a first LPP ProvideAssistanceData message from the server to the target;
   releasing and reestablishing a connection between the server and the target after sending the first LPP ProvideAssistanceData message;
   sending a second LPP ProvideAssistanceData message from the server to the target after reestablishing the connection; and
   wherein the sending of the first LPP ProvideAssistanceData message and the second LPP ProvideAssistanceData message are performed using a same session ID.

2. The method of claim 1, further comprising receiving an LPP Acknowledge message by the server sent from the target acknowledging receipt of the first LPP ProvideAssistanceData message prior to releasing the connection, wherein the second LPP ProvideAssistanceData message is sequentially a next LPP ProvideAssistanceData messages after the first ProvideAssistanceData message.

3. The method of claim 1, further comprising receiving an LPP RequestAssistanceData message by the server sent from the target after reestablishing the connection, the LPP RequestAssistanceData message identifying a next LPP ProvideAssistanceData to be sent by the server.

4. The method of claim 1, further comprising:
   receiving an LPP Acknowledge message by the server sent from the target acknowledging receipt of the first LPP ProvideAssistanceData message;
   sending a subsequent LPP ProvideAssistanceData message from the server to the target only after receiving the LPP Acknowledge message; and
   controlling a flow of transfer of the assistance data from the server to the target by both the server and the target, the server controlling the flow by at least one of delaying the sending the subsequent LPP ProvideAssistanceData message and dynamically controlling the size of the subsequent LPP ProvideAssistanceData message, and the target controlling the flow by delaying sending the LPP Acknowledge message.

5. An apparatus comprising:
   a transceiver to transfer assistance data to a target;
   a processor connected to the transceiver, the processor adapted to segment the assistance data into a plurality of Long Term Evolution Positioning Protocol (LPP) ProvideAssistanceData messages, to send a first LPP ProvideAssistanceData message to the target with the transceiver, to send a second LPP ProvideAssistanceData message to the target with the transceiver after a connection with the target is released and reestablished; and
   wherein the sending of the first LPP ProvideAssistanceData message and the second LPP ProvideAssistanceData message are performed using a same session ID.

6. The apparatus of claim 5, the processor is further adapted to receive an LPP Acknowledge message with the transceiver sent from the target acknowledging receipt of the first LPP ProvideAssistanceData message, wherein the LPP Acknowledge message is sent prior to the connection being released and reestablished; wherein the second LPP ProvideAssistanceData message is sequentially a next LPP ProvideAssistanceData messages after the first ProvideAssistanceData message.

7. The apparatus of claim 5, the processor is further adapted to receive an LPP RequestAssistanceData message with the transceiver sent from the target after the connection is released and reestablished, the LPP RequestAssistanceData message identifying a next LPP ProvideAssistanceData to be sent by the server.

8. The apparatus of claim 5, the processor is further adapted to receive an LPP Acknowledge message with the transceiver sent from the target acknowledging receipt of the first LPP ProvideAssistanceData message, to send a subsequent LPP ProvideAssistanceData message to the target with the transceiver only after receiving the LPP Acknowledge message, and to control a flow of transfer of the assistance data from the server to the target by being adapted to at least one of delay sending the subsequent LPP ProvideAssistanceData message and dynamically controlling the size of the subsequent LPP ProvideAssistanceData message.

9. A method of transferring location information from a target to a server, the method comprising:
   segmenting the location information into a plurality of Long Term Evolution Positioning Protocol (LPP) ProvideLocationInformation messages by the target;
   sending a first LPP ProvideLocationInformation message from the target to the server;
   releasing and reestablishing a connection between the target and the server after sending the first LPP ProvideLocationInformation message;

sending a second LPP ProvideLocationInformation message from the target to the server after reestablishing the connection; and wherein the sending of the first LPP ProvideLocationInformation message and the second LPP ProvideLocationInformation message are performed using a same session ID.

10. The method of claim 9, further comprising receiving an LPP Acknowledge message by the target sent from the server acknowledging receipt of the first LPP ProvideLocationInformation message prior to releasing the connection, wherein the second LPP ProvideLocationInformation message is sequentially a next LPP ProvideLocationInformation messages after the first ProvideLocationInformation message.

11. The method of claim 9, further comprising receiving an LPP RequestLocationInformation message by the target sent from the server after reestablishing the connection, the LPP RequestLocationInformation message identifying a next LPP ProvideLocationInformation to be sent by the target.

12. The method of claim 9, further comprising:
receiving an LPP Acknowledge message by the target sent from the server acknowledging receipt of the first LPP ProvideLocationInformation message;
sending a subsequent LPP ProvideLocationInformation message from the target to the server only after receiving the LPP Acknowledge message; and
controlling a flow of transfer of the location information from the target to the server by both the target and the server, the target controlling the flow by at least one of delaying the sending the subsequent LPP ProvideLocationInformation message and dynamically controlling the size of the subsequent LPP ProvideLocationInformation message, and the server controlling the flow by delaying the sending the LPP Acknowledge message.

13. An apparatus comprising:
a transceiver to transfer location information to a server;
a processor connected to the transceiver, the processor adapted to segment the location information into a plurality of Long Term Evolution Positioning Protocol (LPP) ProvideLocationInformation messages, to send a first LPP ProvideLocationInformation message to the server with the transceiver, and to send a second LPP ProvideLocationInformation message to the server with the transceiver after a connection with the server is released and reestablished; and wherein the sending of the first LPP ProvideLocationInformation message and the second LPP ProvideLocationInformation message are performed using a same session ID.

14. The apparatus of claim 13, the processor is further adapted to receive an LPP Acknowledge message with the transceiver sent from the server acknowledging receipt of the first LPP ProvideLocationInformation message, wherein the LPP Acknowledge message is sent prior to the connection being released and reestablished; wherein the second LPP ProvideLocationInformation message is sequentially a next LPP ProvideLocationInformation messages after the first ProvideLocationInformation message.

15. The apparatus of claim 13, the processor is further adapted to receive an LPP RequestLocationInformation message with the transceiver sent from the server after the connection is released and reestablished, the LPP RequestLocationInformation message identifying a next LPP ProvideLocationInformation to be sent by the target.

16. The apparatus of claim 13, the processor is further adapted to receive an LPP Acknowledge message with the transceiver sent from the server acknowledging receipt of the first LPP ProvideLocationInformation message, to send a subsequent LPP ProvideLocationInformation message to the server with the transceiver only after receiving the LPP Acknowledge message, and to control a flow of transfer of the location information from the target to the server by being adapted to at least one of delay sending the subsequent LPP ProvideLocationInformation message and dynamically controlling the size of the subsequent LPP ProvideLocationInformation.

* * * * *